US009811706B2

(12) United States Patent
Papazian

(10) Patent No.: US 9,811,706 B2
(45) Date of Patent: Nov. 7, 2017

(54) SYSTEM FOR ANONYMOUS COMMUNICATION FROM A USER TO THE PUBLISHER OF A SCANNABLE LABEL

(71) Applicant: Vatche Papazian, Las Vegas, NV (US)

(72) Inventor: Vatche Papazian, Las Vegas, NV (US)

( * ) Notice: Subject to any disclaimer, the term of this patent is extended or adjusted under 35 U.S.C. 154(b) by 0 days.

(21) Appl. No.: 15/141,251

(22) Filed: Apr. 28, 2016

(65) Prior Publication Data

US 2016/0314329 A1 Oct. 27, 2016

Related U.S. Application Data

(63) Continuation-in-part of application No. PCT/US2016/028820, filed on Apr. 22, 2016.

(60) Provisional application No. 62/151,524, filed on Apr. 23, 2015.

(51) Int. Cl.
*G06K 7/10* (2006.01)
*G06K 7/14* (2006.01)
*G06K 19/06* (2006.01)

(52) U.S. Cl.
CPC ..... *G06K 7/1417* (2013.01); *G06K 19/06037* (2013.01)

(58) Field of Classification Search
CPC .. G05B 2219/2615; G05B 2219/34038; G06Q 30/02; G06Q 30/0269; G06Q 30/0273; G06Q 10/06; G06K 9/00369; G06K 7/10366; G06K 7/1417; G06K 9/62
USPC ........... 235/454, 375, 472.01–472.03
See application file for complete search history.

(56) References Cited

U.S. PATENT DOCUMENTS

| | | | | |
|---|---|---|---|---|
| 6,640,145 | B2 * | 10/2003 | Hoffberg ............ | G05B 19/0426 700/17 |
| 7,006,881 | B1 * | 2/2006 | Hoffberg ................ | G05B 15/02 700/17 |
| 8,328,612 | B1 * | 12/2012 | Ansari .................... | A63F 13/12 463/9 |

(Continued)

*Primary Examiner* — Thien M Le
(74) *Attorney, Agent, or Firm* — Berliner & Associates

(57) ABSTRACT

"Publishers" generate individual QR codes which may be either displayed on a smartphone or printed on a physical label, and "consumers" scan and decode those codes for secure and private communication with the publishers, without either party knowing the phone number or email address of the other party. At least one profile associated with the publisher is an anonymous profile that permits the disclosure of only a specified subset of the otherwise available information about that publisher, and that information is not directly embodied in the displayed code, but rather is stored on a secure remote server which is selectively accessible by the consumer. If both parties have not authorized the release of their respective names and phone numbers (or other public contact information) to the other party by exchanging respective public profiles within a predetermined time period, any associated temporary contact numbers are disabled and all anonymous contact information is deleted from the remote server. A remote app on the publisher's smartphone may be used to generate the QR code and upload the associated contact information and permissions to the secure server, and a local app on the consumer's smartphone may be used to scan and process the QR code and commence secure and private communication with that publisher via the secure server.

12 Claims, 25 Drawing Sheets

(56) References Cited

U.S. PATENT DOCUMENTS

| | | | |
|---|---|---|---|
| 2006/0200253 A1* | 9/2006 | Hoffberg | G05B 15/02 |
| | | | 700/19 |
| 2007/0053513 A1* | 3/2007 | Hoffberg | G06K 9/00369 |
| | | | 380/201 |
| 2007/0109597 A1 | 5/2007 | Kodimer | |
| 2011/0016119 A1 | 1/2011 | Kodialam | |
| 2012/0158846 A1 | 6/2012 | Linder | |
| 2012/0325901 A1* | 12/2012 | Ross | G06F 17/30879 |
| | | | 235/375 |
| 2013/0126599 A1* | 5/2013 | Soske | G06F 17/30002 |
| | | | 235/375 |
| 2013/0185368 A1 | 7/2013 | Nordstrom et al. | |
| 2013/0201211 A1 | 8/2013 | Kim | |
| 2013/0346563 A1 | 12/2013 | Huang | |
| 2014/0001253 A1 | 1/2014 | Smith | |
| 2014/0058863 A1* | 2/2014 | Biswas | G06Q 20/354 |
| | | | 705/21 |
| 2014/0068711 A1 | 3/2014 | Schweitzer | |
| 2014/0229251 A1 | 8/2014 | Lim et al. | |
| 2015/0008257 A1 | 1/2015 | Beadles | |
| 2016/0364588 A1* | 12/2016 | Qu | G06Q 10/06 |

* cited by examiner

| INPUT MODE | MAX. CHARACTERS | BITS/CHAR | POSSIBLE CHARACTERS, DEFAULT ENCODING |
|---|---|---|---|
| NUMERIC ONLY | 7,089 | 3 1/3 | 0, 1, 2, 3, 4, 5, 6, 7, 8, 9 |
| ALPHANUMERIC | 4,296 | 5 1/2 | 0-9, A-Z, SPACE, $, %, *, +, -, ., /, : |
| BINARY/BYTE | 2,953 | 8 | ISO 8859-1 |
| KANJI/KANA | 1,817 | 13 | SHIFT JIS X 0208 |

SYSTEM FOR ANONYMOUS COMMUNICATION FROM A USER TO THE PUBLISHER OF A SCANNABLE LABEL

CROSS REFERENCE TO RELATED APPLICATIONS

This application claims the benefit of U.S. Provisional Patent Application 62/151,524 filed on 23 Apr. 2015, which is hereby incorporated by reference in its entirety.

FIELD OF THE INVENTION

The present invention relates generally to exchange of private information over a public network, and more particularly to a system for publishing and using scannable labels for facilitating private communications with a remote business or individual.

BACKGROUND ART

A QR ("Quick Response") code is a machine-readable optical label that typically contains (or is linked to) information about the item to which it is attached. It differs from a conventional UPC barcode label in that the encoded information is presented in two dimensions using a predetermined encoding mode such as numeric, alphanumeric, binary, or character (eg kanji) and an associated error correcting code to store and reconstruct the data, and offers more reliable readability and greater storage capacity. Applications include product tracking, item identification, time tracking, document management, and general marketing.

A QR code consists of a two dimensional array of binary valued cells (typically either black or white square dots arranged in a square grid), which can be captured by an imaging device (such as a digital camera in a smart phone) and processed to reconstruct an approximation of the original two dimensional pattern of dots. Some of the cells have fixed values arranged in a fixed pattern and define the size and orientation of the grid, and other cells represent bits of encoded binary data arranged in rows and columns of the square grid. The associated error correcting code is then used to extract the original data from the horizontal and vertical components of the reconstructed square grid.

The amount of data depends on the size (number of discrete data points) of the label and the complexity (robustness) of the associated error correcting code:

Level L—up to 7% damage
Level M—up to 15% damage
Level Q—up to 25% damage
Level H—up to 30% damage FIG. 1 specifies the data that may be encoded with a 40-L (maximum capacity) QR Code.

Unlike the older, one-dimensional barcodes that were designed to be traversed by a narrow beam of light, a QR code is captured by a 2-dimensional digital image sensor and the resultant digital image data then analyzed by a programmed processor. The processor locates the three distinctive squares at the corners of the QR code image, using a smaller square (or multiple squares) near the fourth corner to normalize the image for size, orientation, and angle of viewing. The small dots throughout the QR code are then converted to binary numbers and validated with an error-correcting code.

Although initially designed for tracking parts in vehicle manufacturing, QR codes now are used in a much broader context, including both commercial tracking applications and convenience-oriented applications aimed at mobile-phone users (termed mobile tagging). QR codes may be used to display text to the user, to add a vCard contact to the user's device, to open a Uniform Resource Identifier (URI), or to compose an e-mail or text message. Various QR code apps are available that can be used for publishing (generating and printing) a new QR code and for using (capturing and interpreting) a previously published QR Code. Japan's NTT DoCoMo has established de facto standards for the encoding of URIs, contact information, and several other data types. The open-source "ZXing" project maintains a list of QR code data types.

QR codes have been used over a wide range of applications, including commercial tracking, entertainment and transport ticketing, product/loyalty marketing and in-store product labeling. Many of these applications target mobile-phone users (via mobile tagging). Users may receive text, add a vCard contact to their device, open a URI, or compose an e-mail or text message after scanning QR codes. They can generate and print their own QR codes for others to scan and use by visiting one of several pay or free QR code-generating sites or apps. Recruiters have placed QR codes in job advertisements, while applicants have placed their own QR code in their CVs and visiting cards. QR codes can also be used in accessing personal information for use by organizations.

Typically, a smartphone having a built in digital camera and a built in QR scanning app functions as a QR code scanner and extracts (and optionally displays) the encoded digital data in its original format (numeric, alphanumeric, binary, or character). A special user app (typically downloaded from or otherwise in communication with the same website that created and published that particular QR code) converts the decoded digital data into some useful digital format (such as a standard URL for a website), thereby obviating the need for a user to type the encoded data into a web browser or other user app. Such a QR code representation of a brand's URL has become a focus of advertising strategy, since it provides a way to access a brand's website more quickly than by manually entering the individual characters comprising the URL and any associated search parameters.

QR codes storing addresses and URLs may appear in magazines, on signs, on buses, on business cards, or on almost any object about which users might want information. Users with a camera phone equipped with the correct reader application can scan the image of the QR code to display text, contact information, connect to a wireless network, or open a web page in the phone's browser. This act of linking from physical world objects is termed hardlinking or object hyperlinking. QR codes also may be linked to a location to track where a code has been scanned. Either the application that scans the QR code retrieves the geo information by using GPS and cell tower triangulation (aGPS) or the URL data encoded in the QR code itself is associated with a location.

QR codes can be used with various mobile device operating systems to support URL redirection, which allows the QR codes to input metadata to existing applications on the device. Many paid or free apps are available with the ability to scan the codes, extract the embedded metadata, and hard-link to an external URL.

QR codes can be also used to establish a secure log in to an associated device: a QR Code is shown on the login page on a computer screen, and when a registered user scans that code with a verified smartphone, that user will automatically be logged in on the computer. Authentication is performed by the user's smartphone which uses the information in QR code to contact the responsible authentication server and execute the appropriate authentication protocol.

The amount of data that can be stored in the QR code symbol depends on the datatype (mode, or input character set), version (1 through 40, indicating the overall dimensions of the symbol), and error correction level (Low=7%, Medium=15%, Quality=25%, or High=30%). The maximum storage capacities occur for 40-L symbols (version 40, error correction level L), as set forth in FIG. 1.

US Patent Publication 2014/0032285 describes a system in which scanning a QR code generates an email address to a payment gateway. US Patent Publication 2014/0117087, describes a system for using QR codes in a dating service.

SUMMARY

In accordance with one aspect of the present invention, a business owner (or other responsible individual) dealing with external customers (or other unrelated individuals) is able to validate and correlate orders, offers, reviews and/or suggestions from a customer (or other unrelated individual) by means of an encoded label that is physically associated with a particular time, location, activity, and/or transaction associated with an interaction between the business and the unrelated individual, and that may be used by any such unrelated individual to initiate and/or validate a private and/or anonymous communication with the business owner in a manner that allows the business owner to manage his business and improve its service without any direct confrontation with that particular customer.

In accordance with another aspect of the present inventions, a first individual seeking to establish a relationship (either personal or professional) with other individuals is able to initiate limited communication with those other individuals by means of an encoded label that is physically associated with the first individual, but that does not include any private information (such as email addresses or Facebook pages) that the first individual does not want to disclose to strangers. The encoded label may then be used by another individual to establish a private and/or anonymous communication with the first individual.

In a presently preferred embodiment, a "publisher" desiring to maintain private and anonymous communications with customers or casual acquaintances or other unrelated individuals ("consumers") must first download a remote app that generates QR codes specific to the publisher which may be either displayed as individual digital images on a smartphone or other interactive display device in the physical possession of the publisher or printed on a physical label which is accessible to the particular consumers of interest to that publisher, In either case, the consumers are also required to install a local app (which can be the same as (or part of a subset of) the downloaded remote app) on their devices in order to scan and decode the displayed or printed QR code and commence secure and private communication with the publisher via a remote server.

The publisher's remote app preferably includes a first means for receiving contact information and other private details relating to each of the publisher's profiles, a second means for generating a unique identification code (and associated QR code symbol) for each specified profile, a third means for publishing the QR code symbol for each unique code if and when instructed to do so by the publisher, and a fourth means for transmitting to a secure remote server the unique code and any related details for each of the publisher's profiles.

The consumer's local app (or if the consumer is also a publisher, the local app portion of his remote app) preferably includes a first means for enabling the consumer's interactive device to scan a digital image of the publisher's displayed QR code symbol, a second means for processing that digital image to recover the embedded unique identification code, and a third means for transmitting the recovered unique identification code and any relevant details of the consumer's profile to the secure remote server.

A table is preferably maintained by the remote app for storing previously received transactional codes and the corresponding contact and transactional details for the specific profile which each code represents, including any later received updates and/or deletions thereof.

In a first exemplary specific embodiment, in response to the transactional code derived from a particular QR code and any accompanying message received from a particular consumer, the remote server sends a text message or email (or other private communication) to the individual or business who published that QR code without revealing to that publisher the text address (mobile phone number) or email address or any other private information associated with the consumer who scanned that QR code. By this means, the consumer can send an anonymous text message, email, or other message (and/or can forward that accompanying message) to the owner or management of a business, without either party knowing the phone number or email address (or other contact information) of the other party.

In a second exemplary specific embodiment, a unique QR code is generated by the remote app for each individual "publisher" (or if a particular publisher wishes to maintain different public and/or anonymous profiles for different categories of acquaintances, for each profile maintained by that publisher) by means of the remote app. Upon scanning and interpretation of the published code for a particular "profile" and transmittal of that code to the secure server, the remote apps of unrelated "consumers" have access only to certain information about a particular publisher that has been uploaded to the secure server by that publisher's remote app, linked to the particular profile associated with that particular published code, and marked as "disclose". For example, the information stored on the secure server may include first name, last name, phone number, address, email, Identification and/or Driver's License number, social security number, and photo, but the information disclosed to the unrelated consumer will be limited to first name, photo, and a numerical code which may be used to send a limited number of text messages as defined by the "anonymous" profile that corresponds to the particular code that was displayed by the publisher and was scanned by the consumer.

In both of these specific embodiments, at least some (and preferably all) of the stored information about a particular business or individual responsible for publishing the QR code is not directly embodied in the code, but rather is stored on the remote app or on the same secure remote server which is selectively accessible by the local apps of the respective parties.

An enhanced log be maintained at the secure remote server for storing each instance of a received transactional code together with the time of transmission to the remote app and any other transactional details associated with that transmission, whereby suspicious transmissions from a particular user or user device for transmission to another particular user or user device may be identified and appropriate action may be performed after a specified number of such communications have been received.

In a presently preferred embodiment, an individual or a business or other group of affiliated individuals (the "publisher") desiring to maintain private and/or anonymous communications with customers or other unrelated individuals (the "consumer") must first download a remote app that generates two dimensional QR codes specific to that publisher which may be either displayed on an interactive display device (such as a SmartPhone) or printed on a physical label, whereby a specific QR code associated with that particular publisher may be selectively displayed to one or more consumers of interest to that publisher. Once a particular consumer has already installed a local app (which can be the same as the downloaded remote app) on his interactive display device, he may scan and decode the displayed or printed code and use that decoded information to commence communication (preferably anonymous) with the publisher, optionally including details (such as time, transaction, and/or location) associated with its display by the publisher and its scanning by the consumer.

In a first exemplary specific embodiment, the local app instructs the remote app to send a text message or email to the individual or business who published the code but did not make public the text address (mobile phone number) or email address of the publisher. By this means, a customer (the consumer) can send a private text message, email, or message to the owner or management of a business (the publisher), without either party knowing the phone number or email address of the other party.

In a second exemplary specific embodiment, the publisher's remote app generates and displays (publishes) the publisher's QR code (or a selected QR code if the publisher has more than one "profile") prior to the the publisher's display device being scanned by a particular consumer's interactive display device by means of a local app (which may be the same as the remote app). Preferably, at least one profile associated with the publisher is an anonymous profile that permits the disclosure of only a specified subset of the otherwise available information about that publisher. For example, the known information about the publisher may include first name, last name, phone number, address, email, Identification and/or Driver's License number, social security number, and photo, but the specified information disclosed to the unrelated consumer scanning the QR code associated with such an anonymous profile might be limited to first name, photo, and a temporary contact number which may be used to send a limited number of text messages during a limited time to the particular publisher.

In both of these specific embodiments, most (and preferably all) of the known information about a particular business or individual responsible for publishing the code is preferably not directly embodied in the displayed code, but rather is stored on the secure remote server which may be selectively accessible by the consumer's local app once that particular consumer has been given the appropriate permission. This is true even if the coded label uses a relatively high capacity two dimensional format such as a QR code.

In a further refinement of the invention, at least some information about the consumer is also stored on the secure remote server in a manner analogous to that of the publisher (preferably using the same remote app functionality), whereby the consumer may selectively authorize access to his information by, and/or direct communication from, the publisher who initiated the contact with the consumer. In yet another refinement, if both parties have not authorized the release of their respective names and phone numbers (or other public contact information) to the other party within a predetermined time period, any associated temporary contact numbers are disabled and all associated information is deleted from the remote server.

BRIEF DESCRIPTION OF DRAWINGS

FIG. 1 specifies the data that may be encoded with a 40-L (maximum capacity) QR Code.

FIGS. 2 through 25 are screen shots showing a typical operational sequence that may be performed by a presently preferred embodiment of the invention.

DETAILED DESCRIPTION

Figure 2:
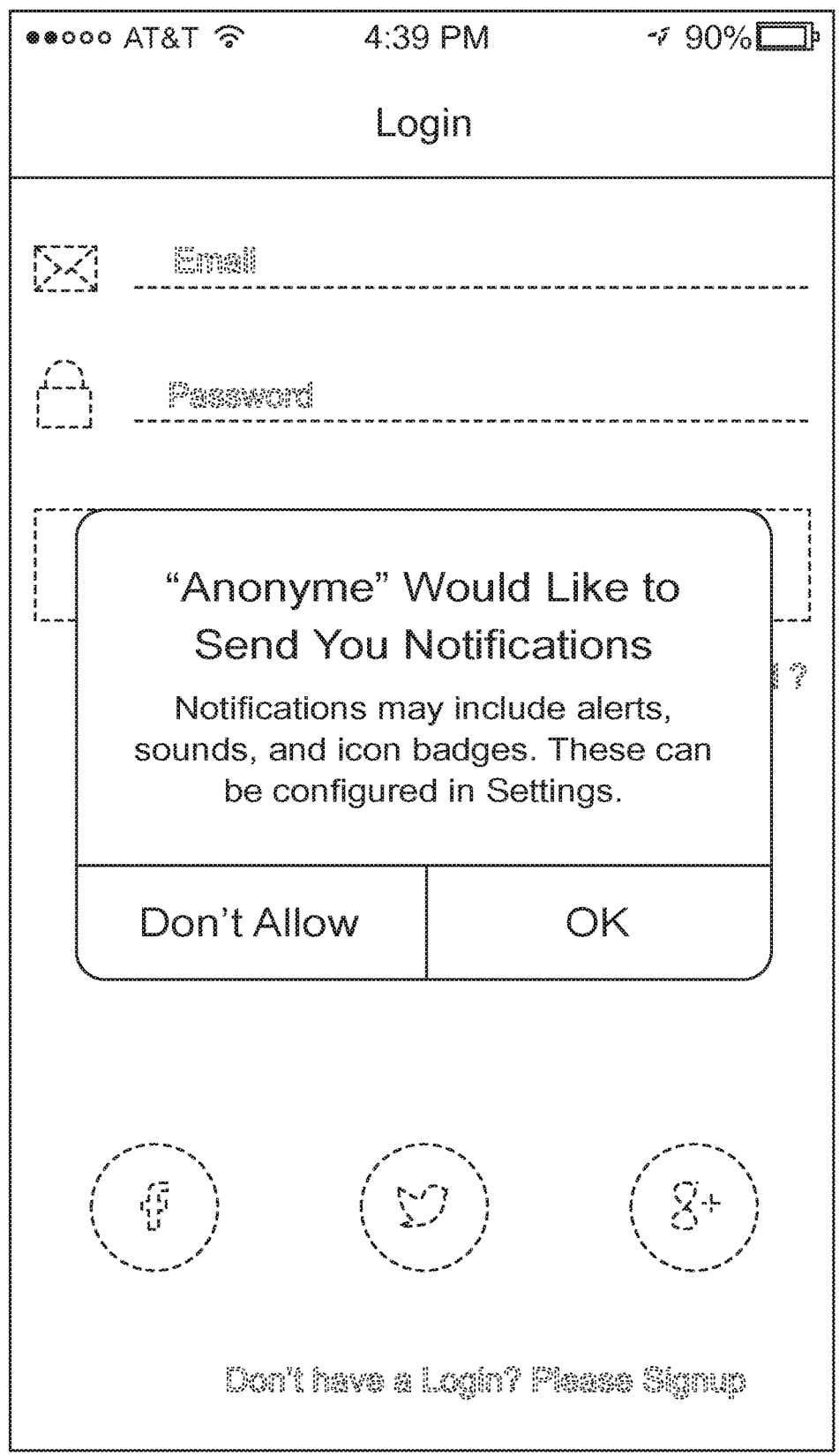
Figure 3:
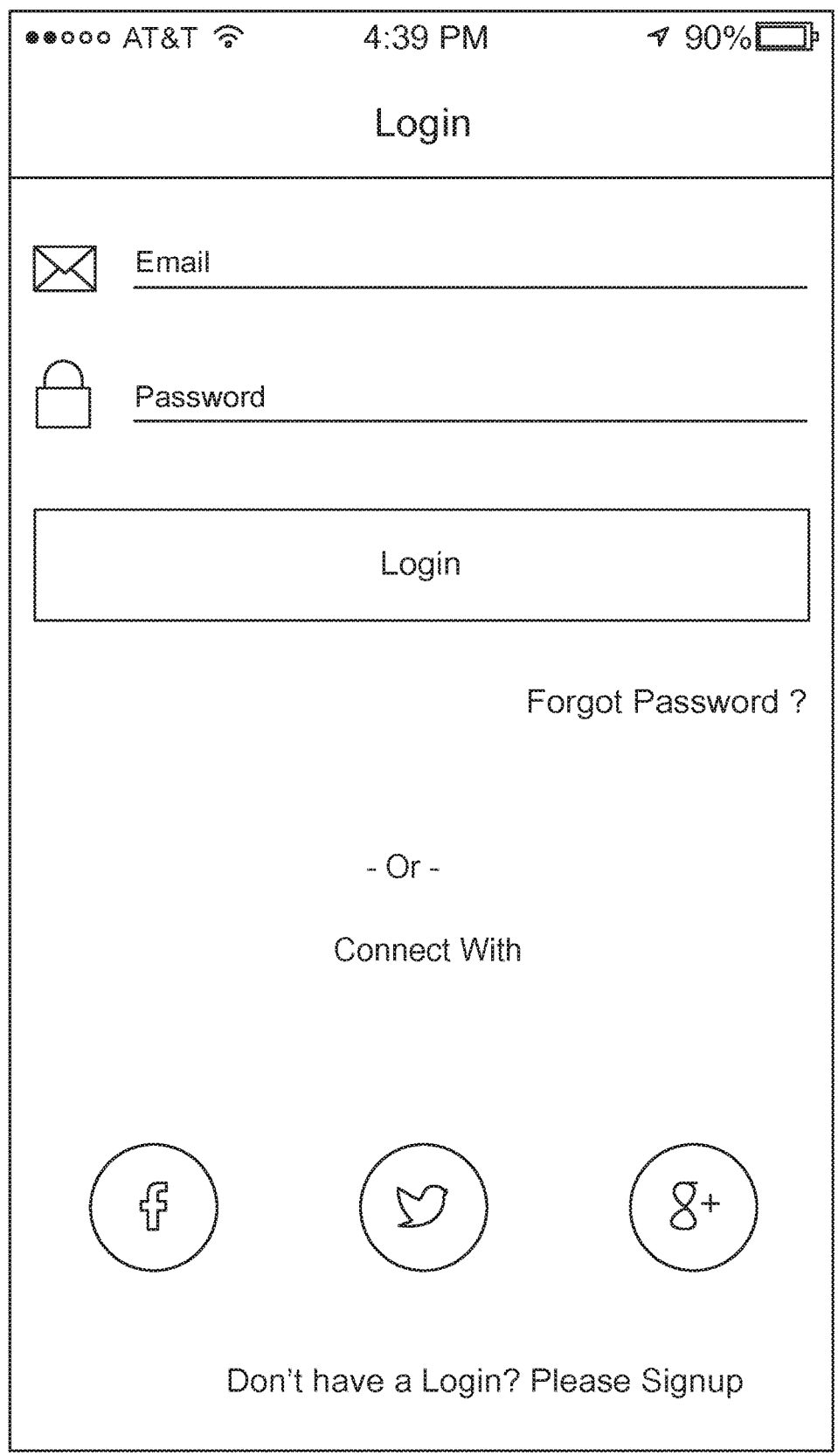

A presently preferred embodiment combining aspects of the previously described embodiments is shown in FIGS. 2 though 25. FIGS. 2 and 3 represent the first page that comes up on the publisher's screen, which asks him to allow ("OK") push notifications. Then it is followed by the login screen (FIG. 3), by entering the user's "Email" and "Password", (default at top of screen), or by linking to Facebook, Twitter, or GooglePlus, using respective buttons at bottom of screen.

Figure 4:
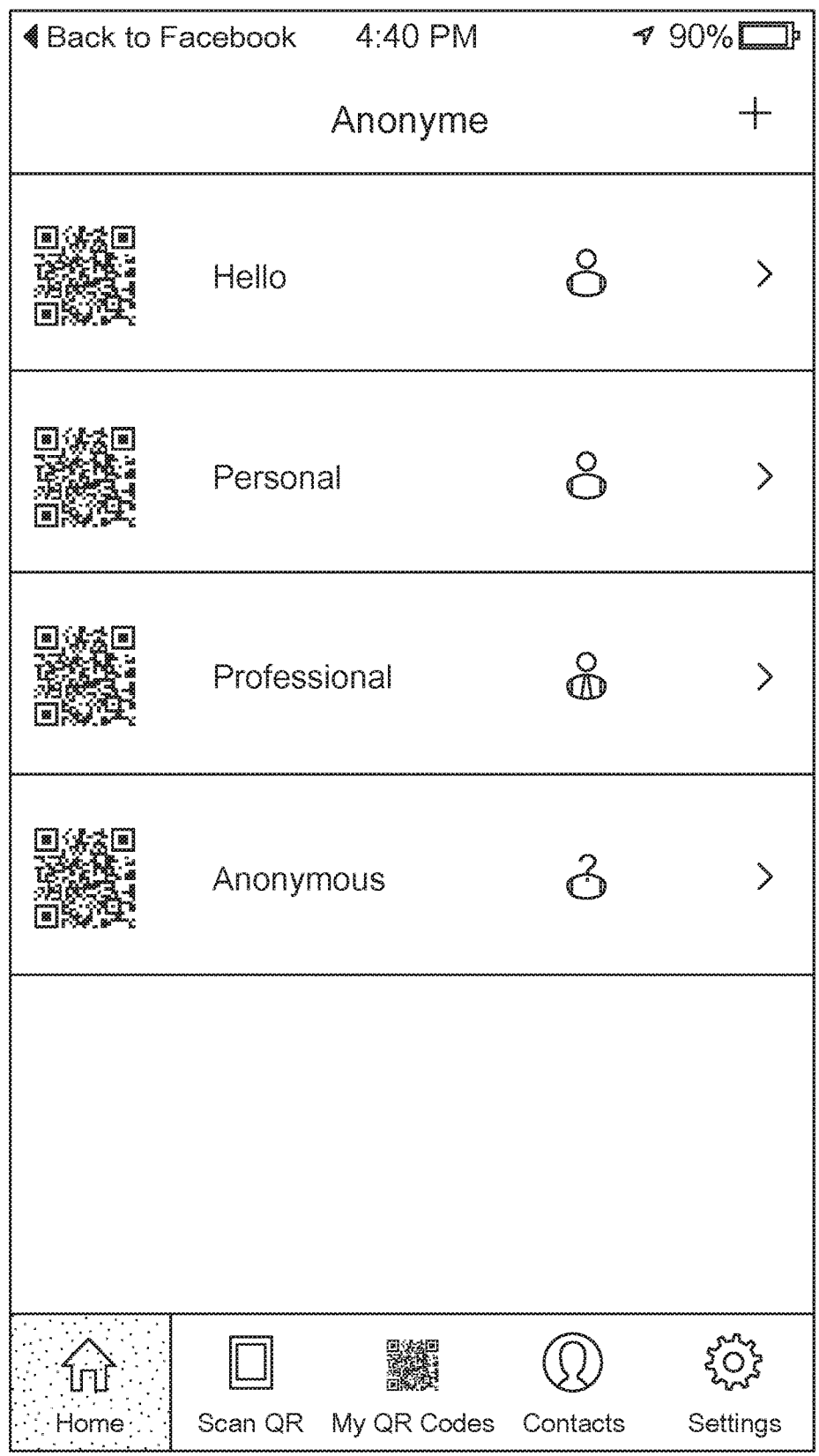
Figure 5:
Figure 14:
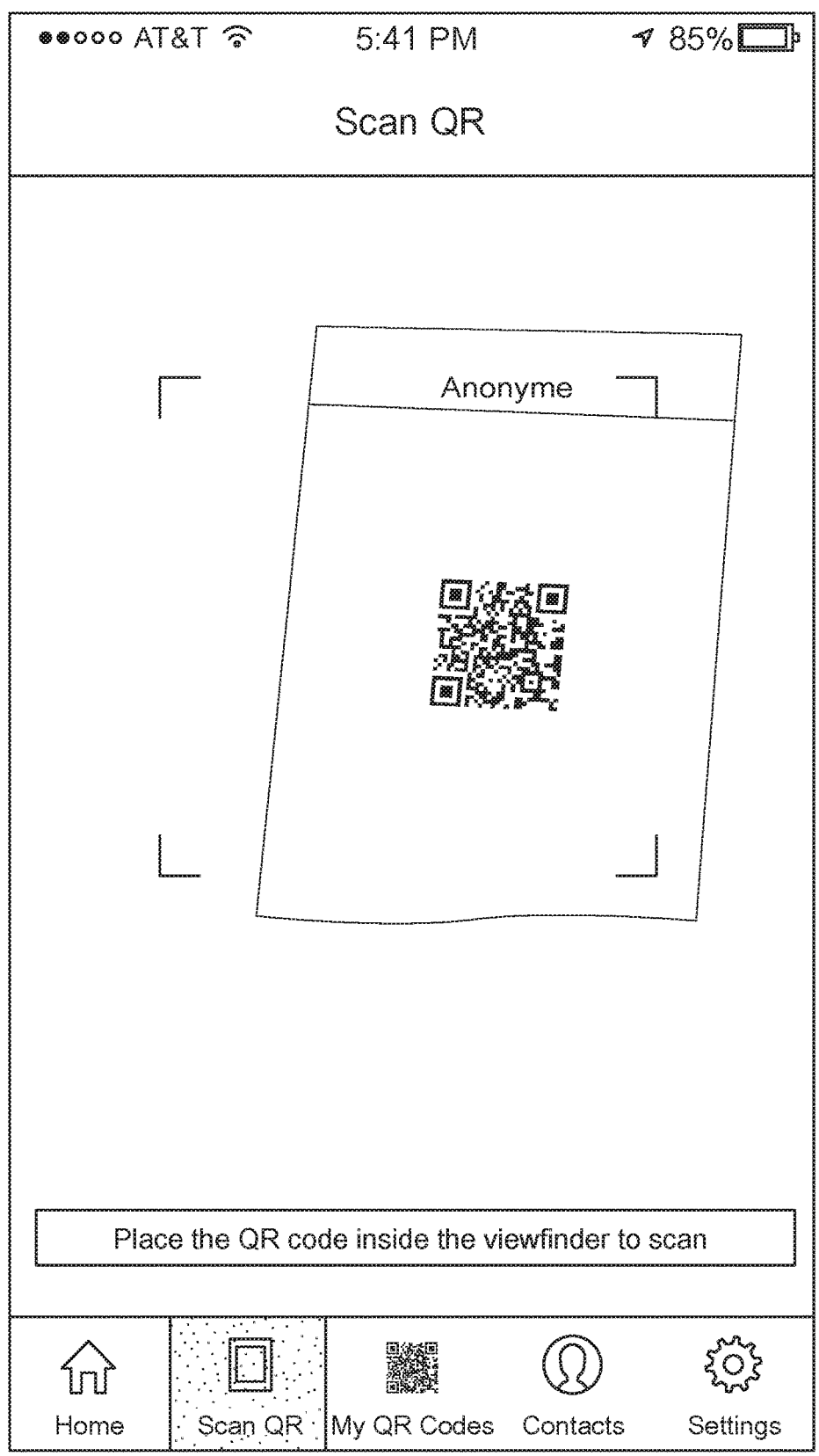

FIG. 4 shows the different QR profiles the user has created, including 3 default profiles that the app comes with. When the user selects (clicks on) one of these saved profiles, a correspondingly labeled QR code appears (FIG. 5) on the publisher's screen whereby it may be scanned by the other user (eg, a customer) (See also FIG. 14).

Figure 6:
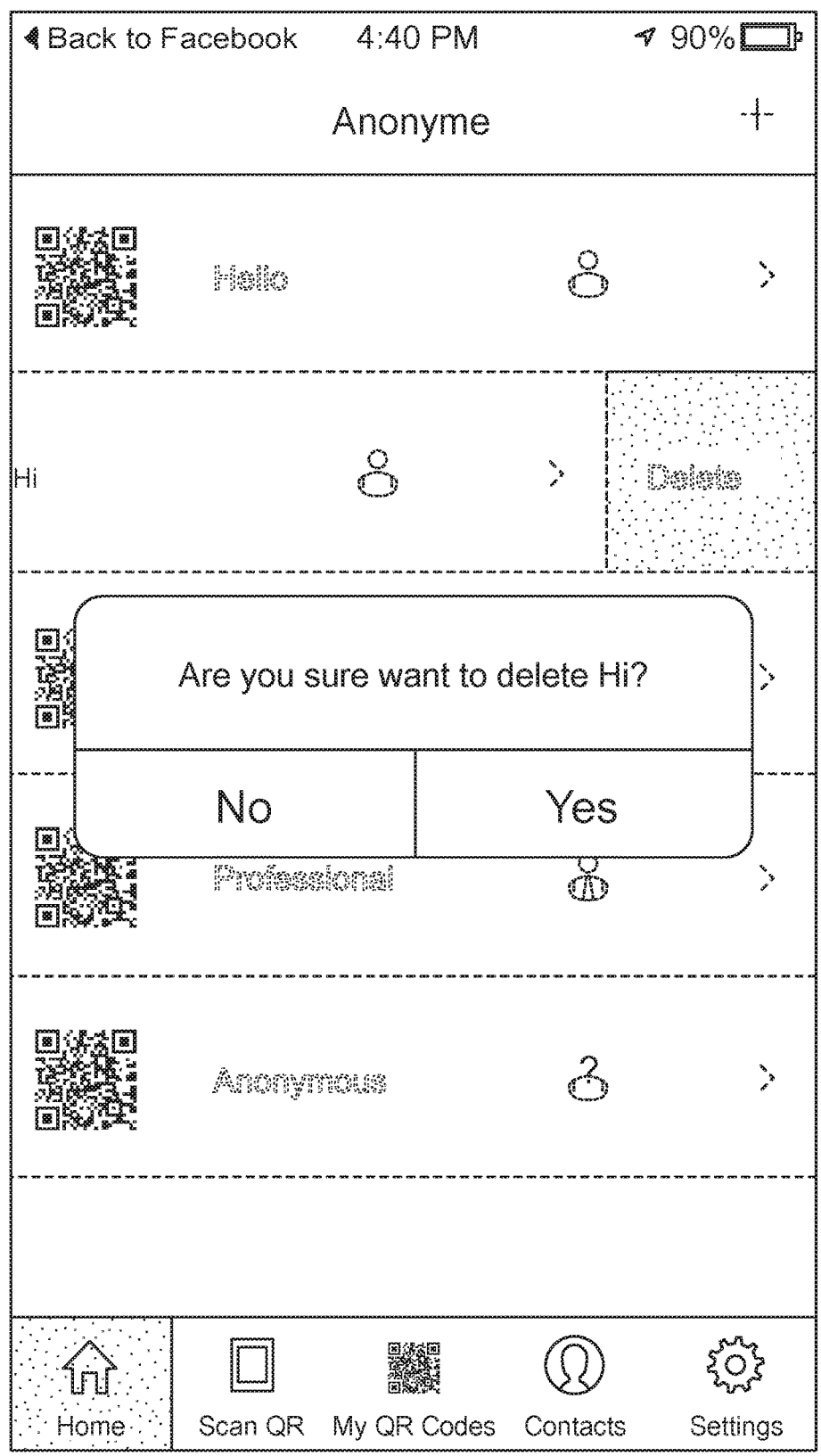

FIG. 6 shows how a saved profile may be deleted. To delete a profile, simply slide (iOS) and tap (iOS) or hold (Android) Delete. Then confirm that you want to delete it.

Figure 7:
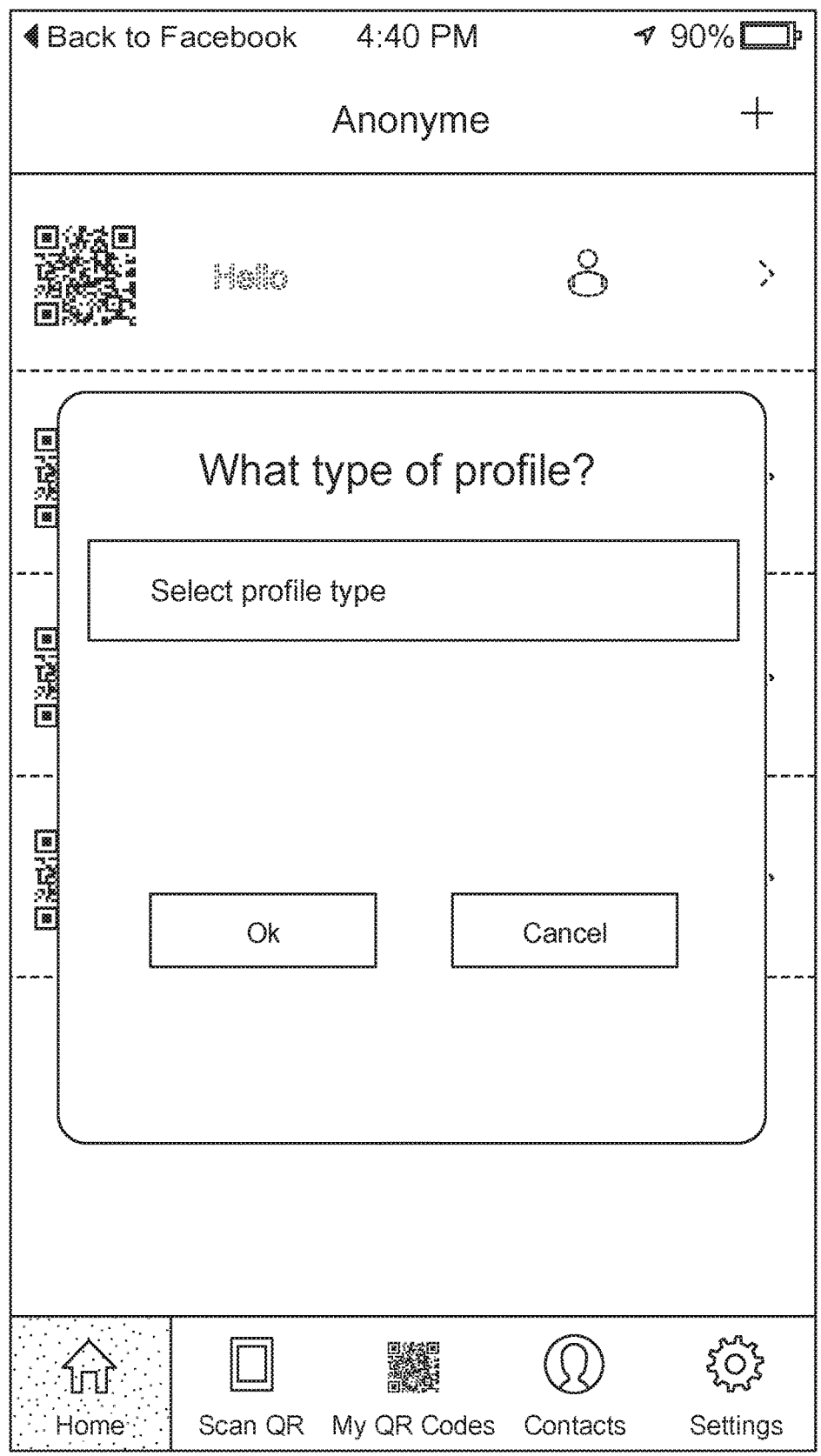
Figure 8:
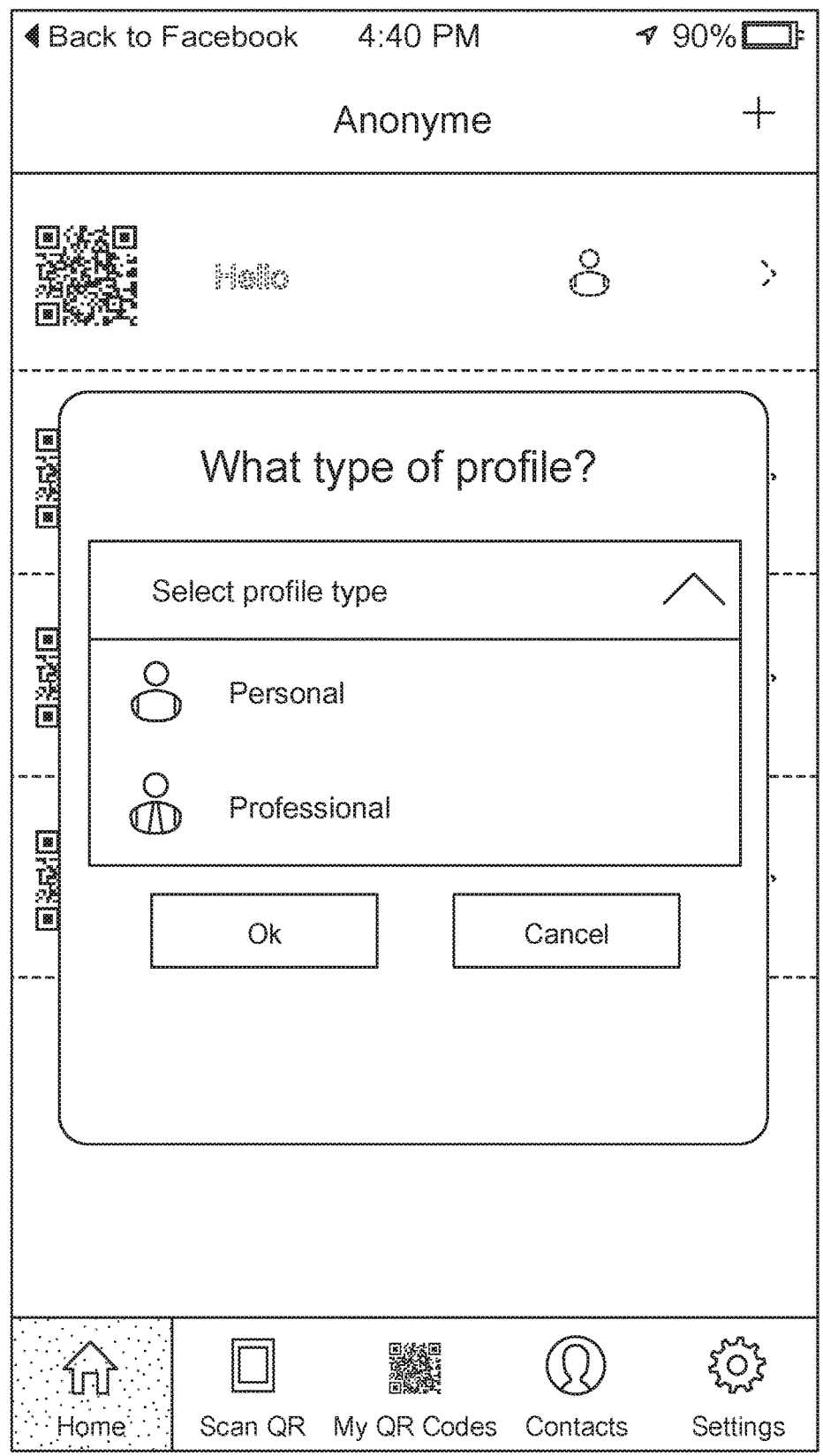

FIGS. 7 and 8 show how a new profile may be created by simply clicking the +(add) icon on the top right on the home page, and then selecting the profile type (Personal or Professional).

Figure 9:
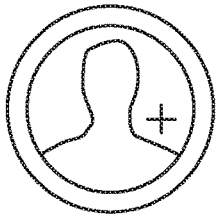
Figure 10:
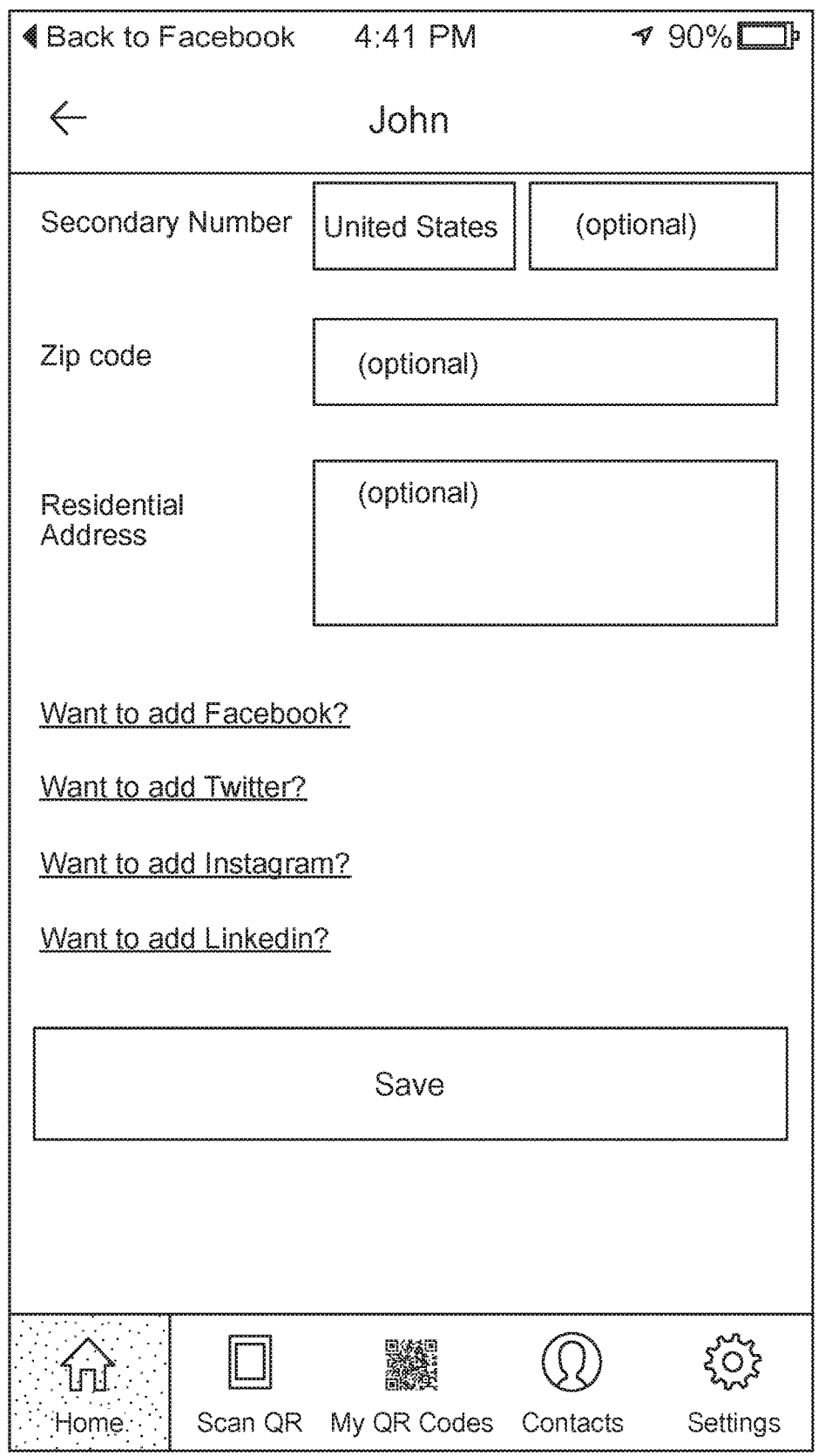
Figure 11:
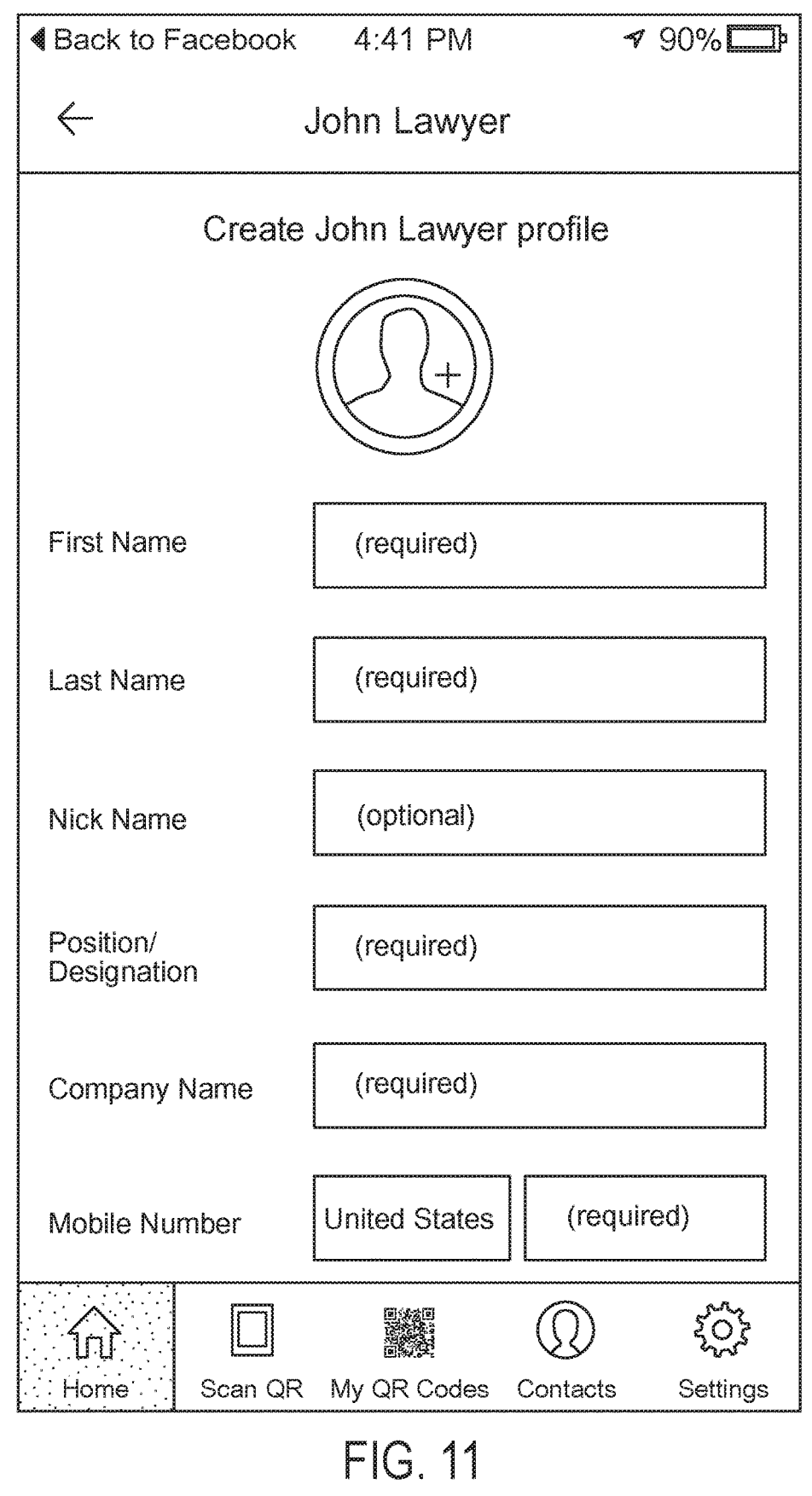
Figure 12:
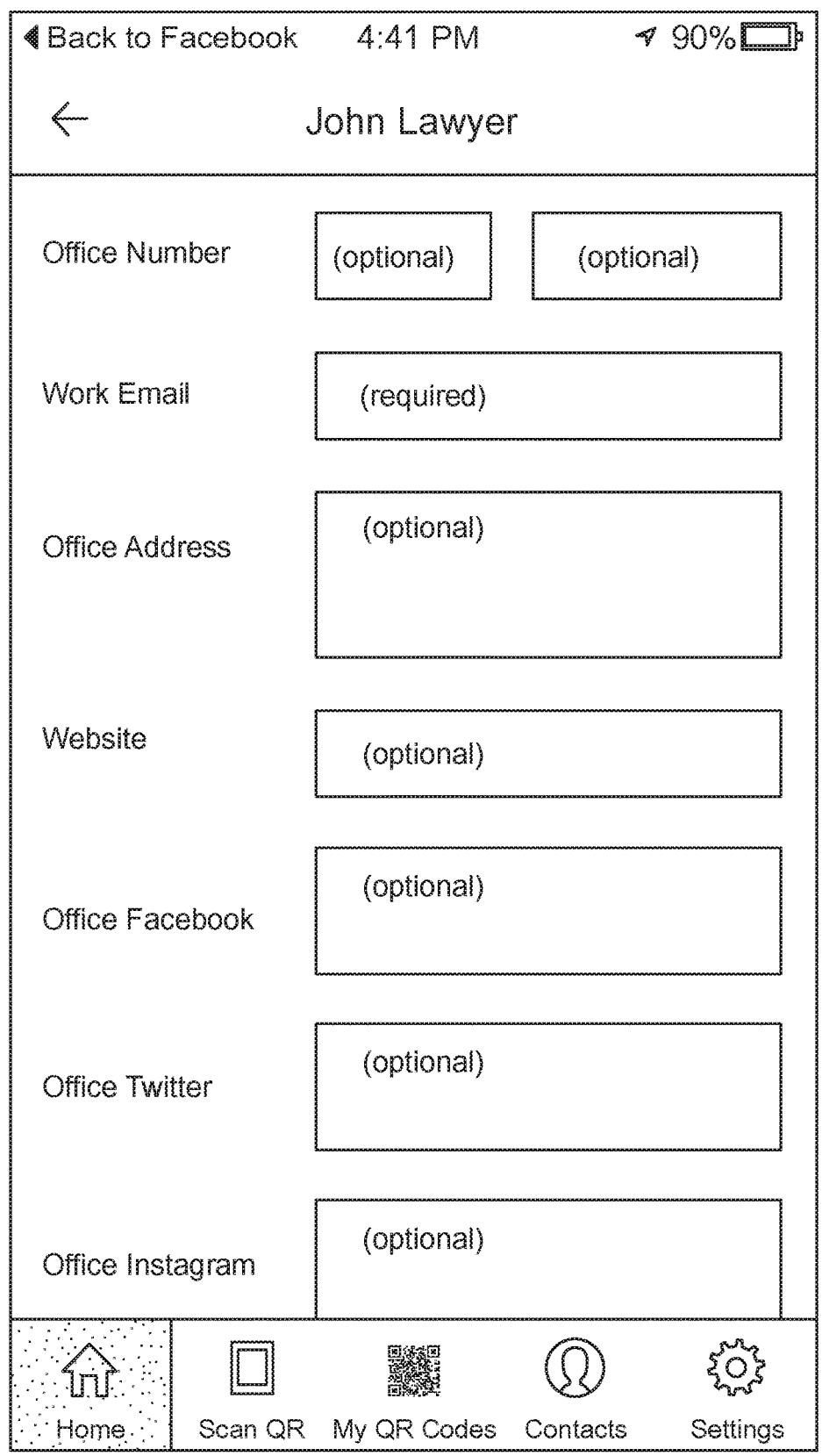
Figure 13:
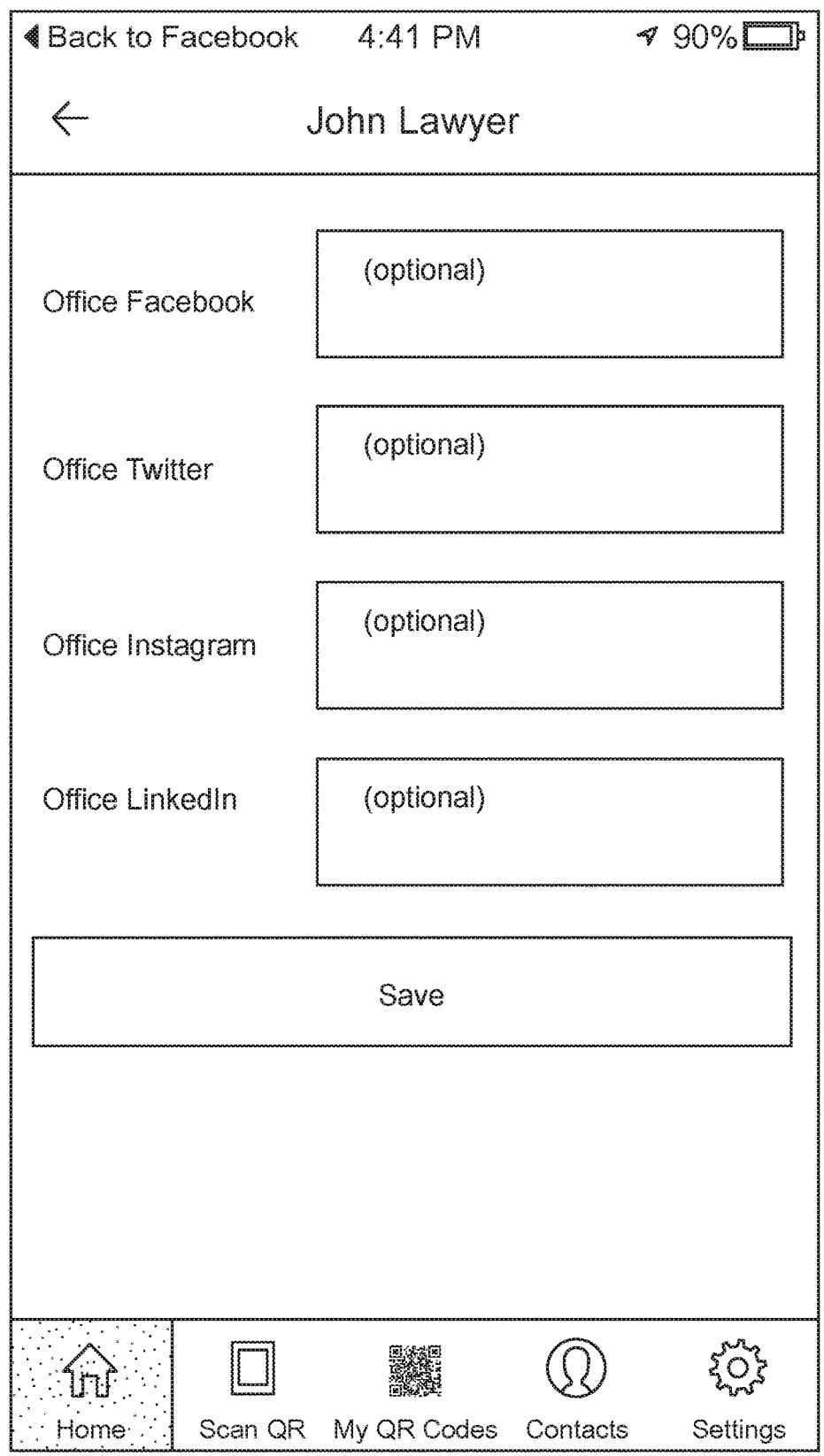

FIGS. 9 and 10 show the available information fields for a PERSONAL profile ("John" in the illustrated example); FIGS. 11, 12 and 13 show the available information fields for a PROFESSIONAL profile ("John Lawyer" in the illustrated example).

Figure 15:
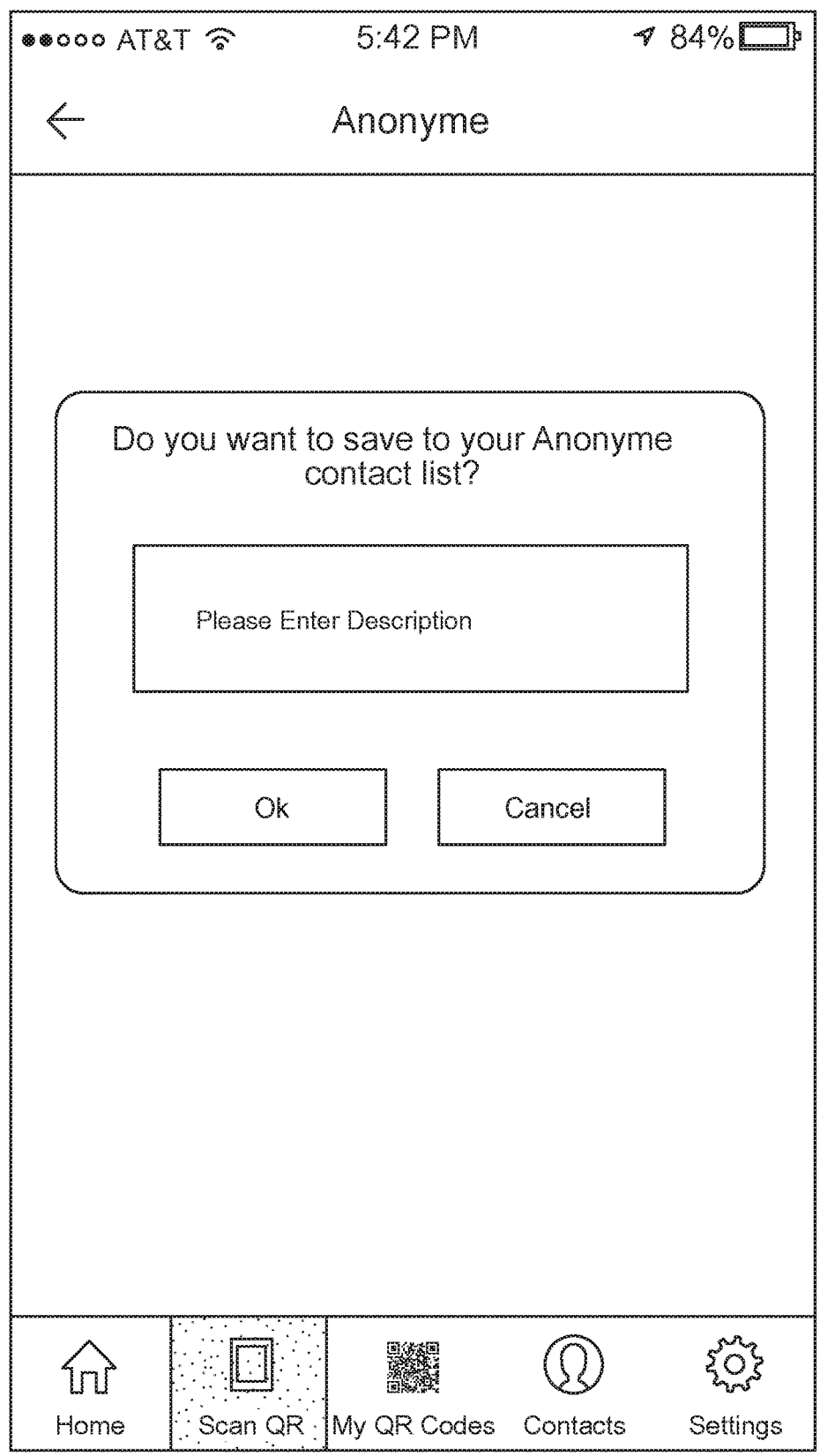
Figure 16:
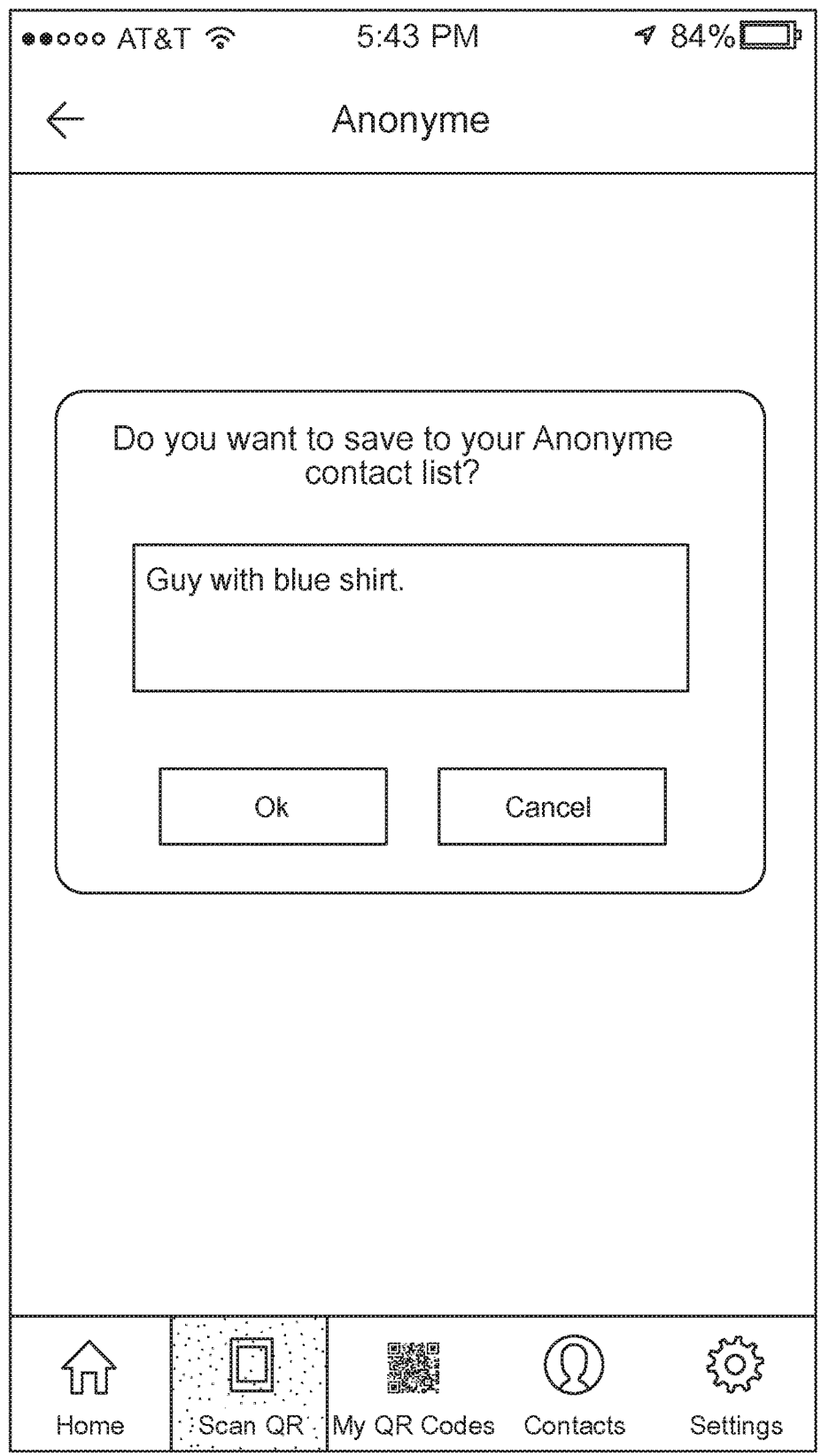

After the publisher's selected QR code appears on his screen (FIG. 14), the publisher can show it to another user (the "consumer") with a local app which has a Scan QR mode which scans it when the customer places his phone's camera above the QR code displayed on the publisher's screen. Once the consumer (eg, a potential customer at a trade show) has thereby successfully scanned the displayed QR code, a box (FIG. 15) appears on his screen, which allows him enter a description (optional) and save the associated contact code and any optional description as a new anonymous contact (FIG. 16).

Figure 17:
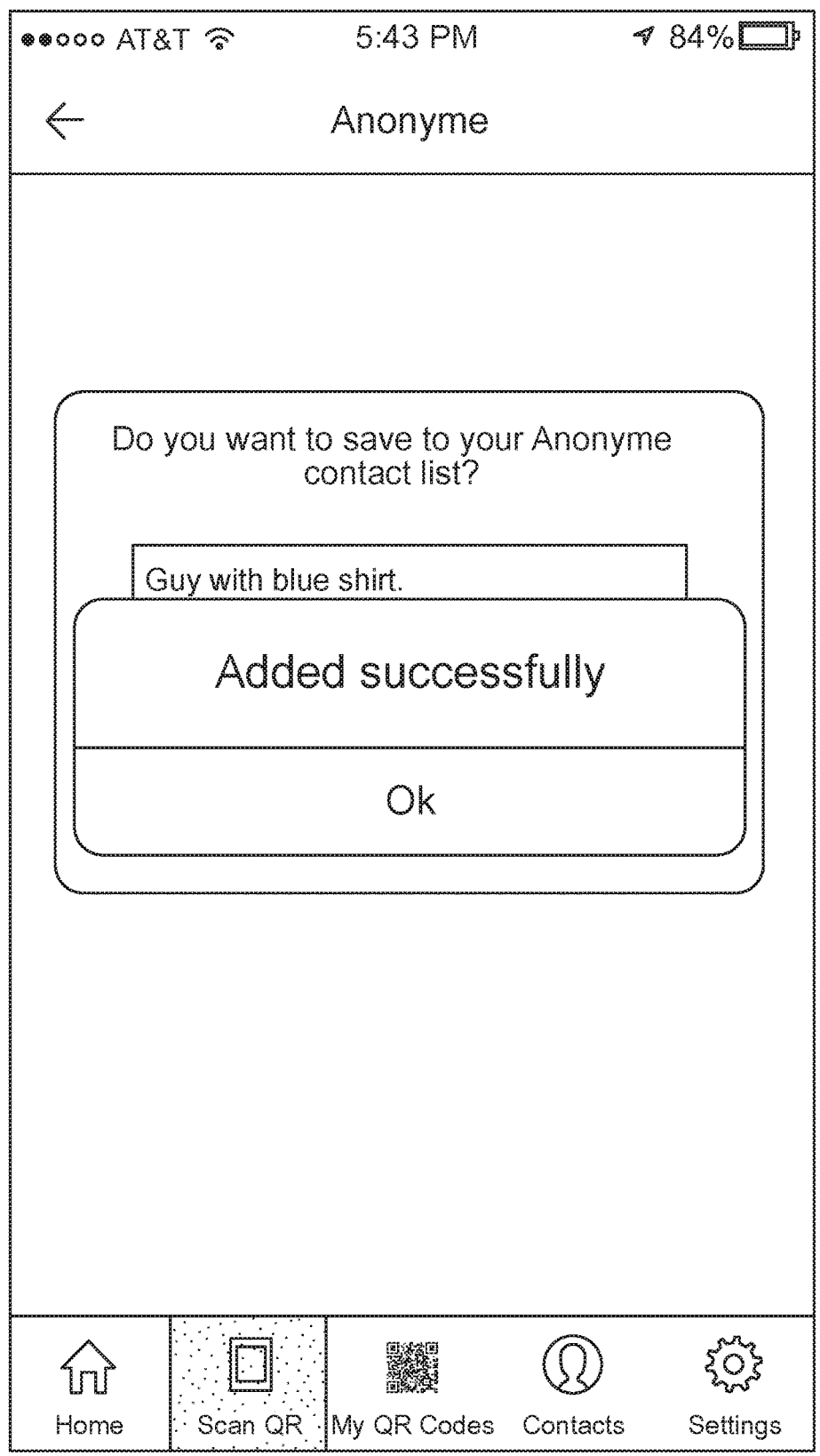

After that other user clicks "OK", an "added successfully" message is displayed on his screen (FIG. 17), which verifies that the publisher's contact info (as defined in the particular profile which created that particular QR code) has been added successfully to the customer's Contacts.

Figure 18:
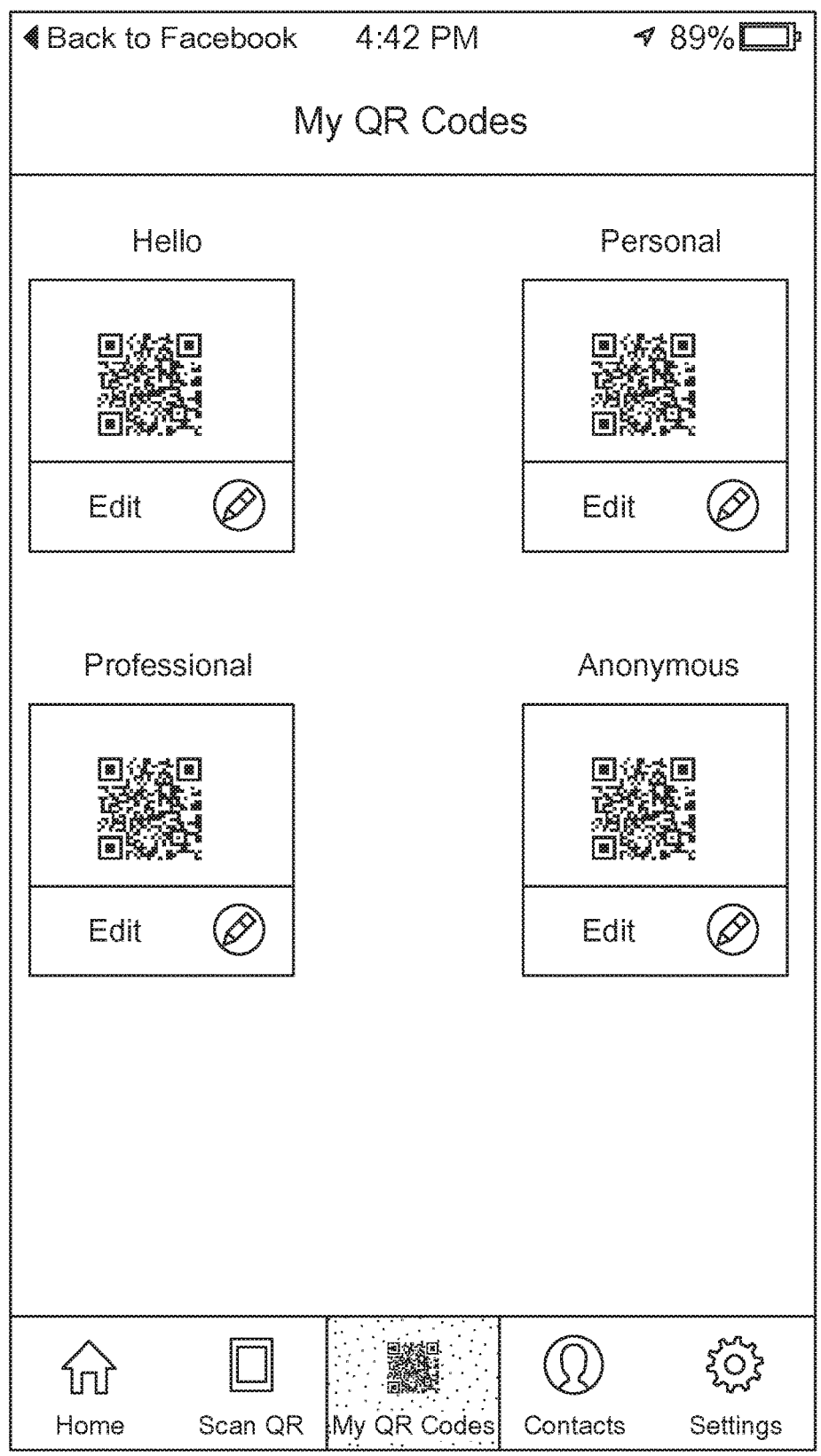
Figure 19:
Figure 20:
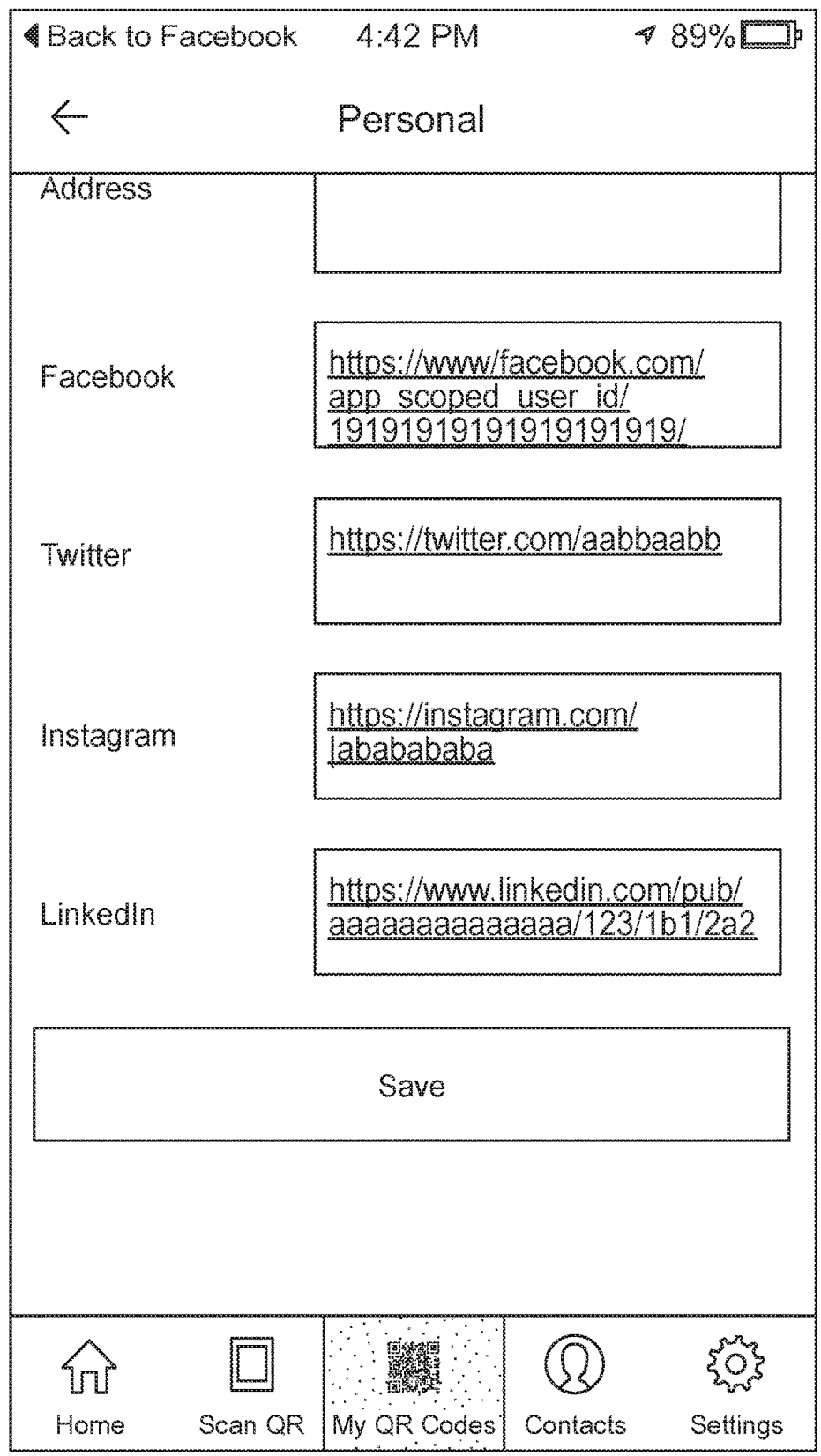

To edit his QR profile, the user simply goes to his "My QR Codes" tab (FIG. 18) and clicks Edit on whichever profile he want to edit, whereupon the previously stored information for that profile (FIGS. 19 and 20) Is displayed. This will allow you to edit any of the fields of the selected profile. When finished editing, click "Save", and the profile(s) will be updated.

Figure 21:

To see your contacts, click on the "Contacts" tab (FIG. 21). The contacts are displayed by group in the following order: Personal profiles first (in alphabetical order), then Professional profiles (in alphabetical order), and then Anonymous profiles (in alphabetical order). If there is no name associated with the QR code you have scanned, then that profile goes on top displaying any description you may have entered, which is why the contact "Business" is before "Bob". You may email, text, or call your contacts by clicking the corresponding icons, but only if that contact has shared that information with you.

Figure 22:
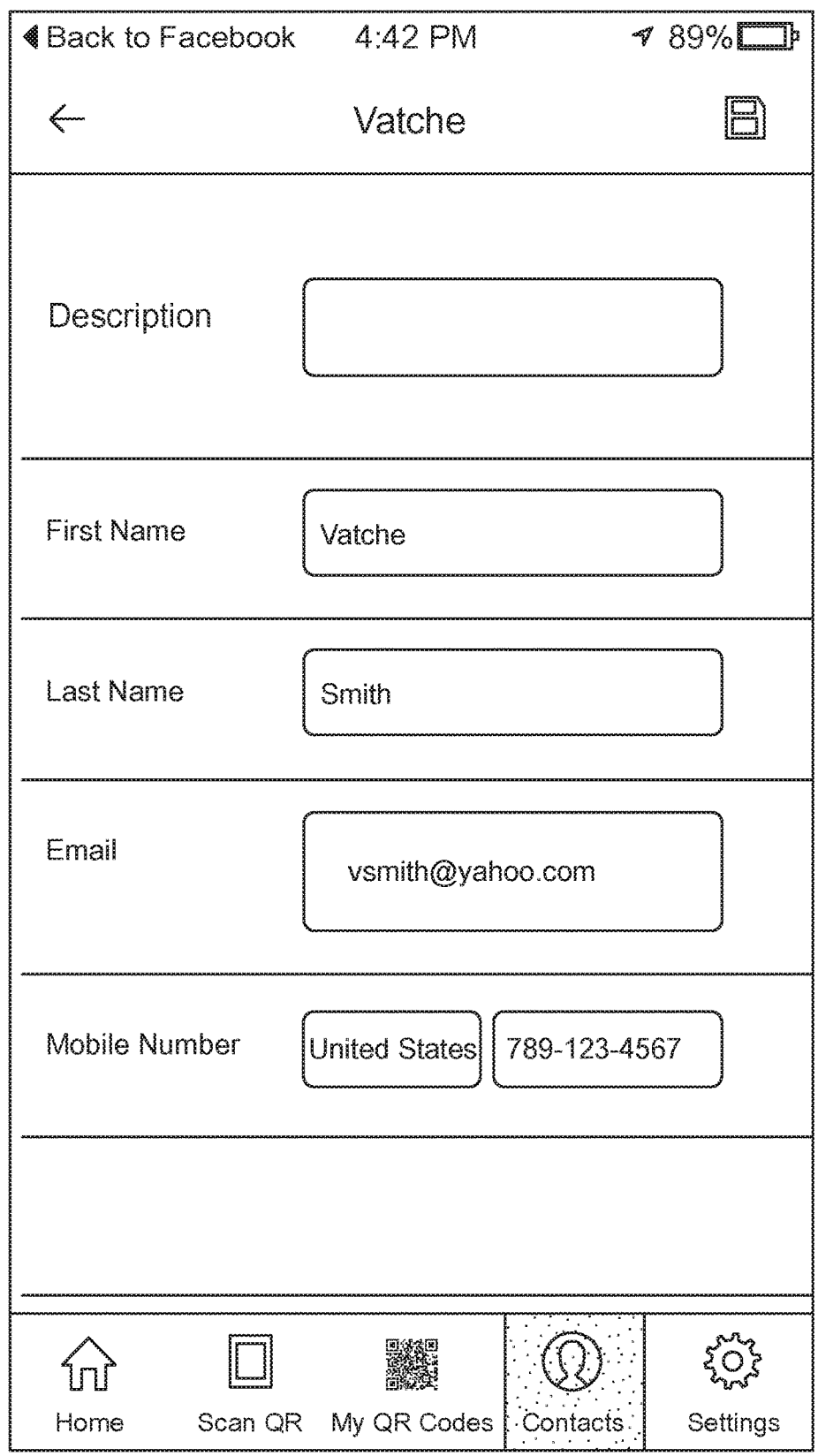

As shown in FIG. 22, you may also see (and possibly edit) the information your contacts have shared with you by clicking on the profile icon (FIG. 21) for that contact.

Figure 23:
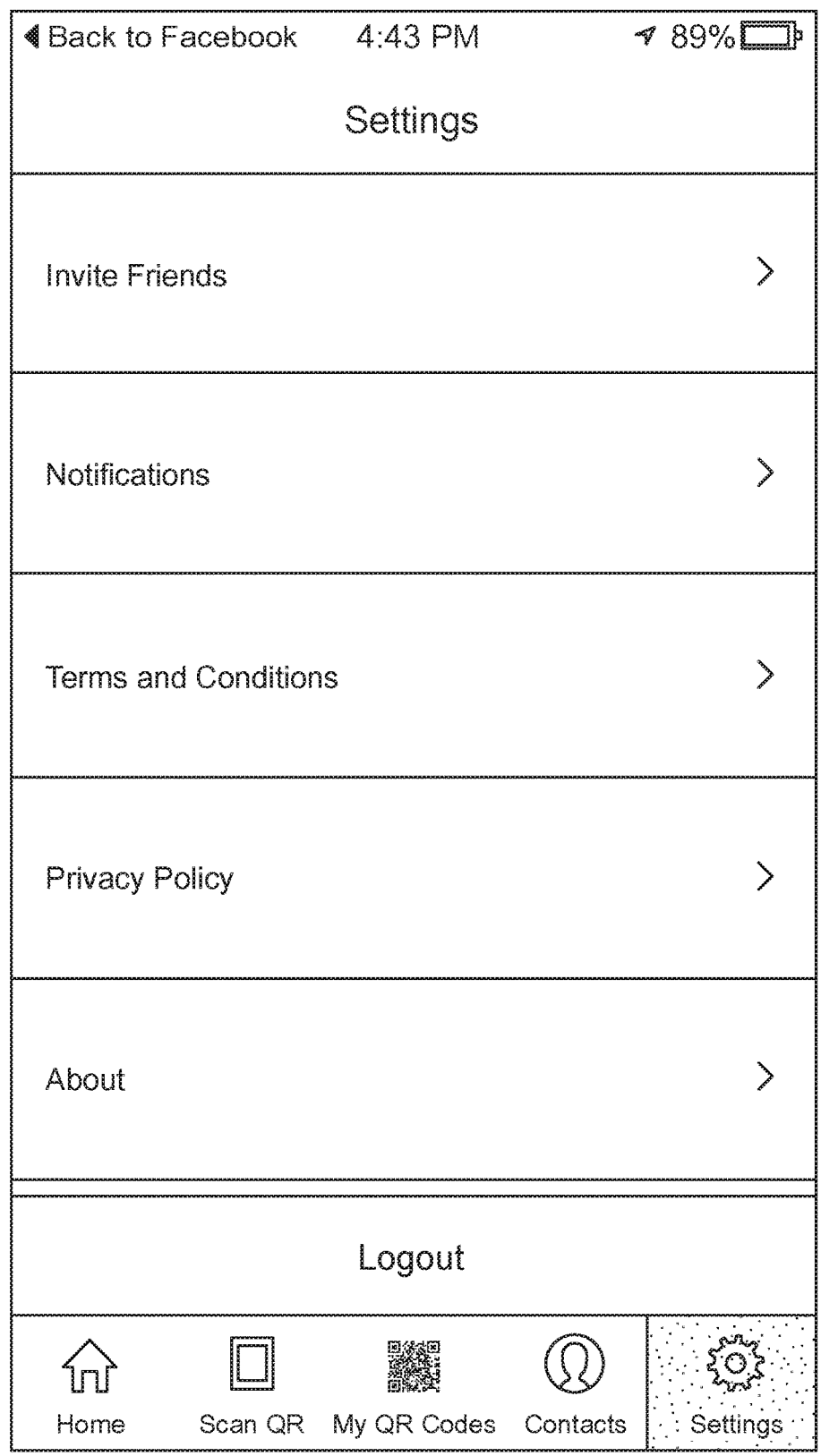

FIG. 23 shows the "Settings" page, where users can invite friends via email, text, Facebook, Twitter, or GooglePlus; view any Notifications (see below); see the relevant "Terms and Conditions", "Privacy Policy", and/or About" pages, or Log Out.

Figure 24:
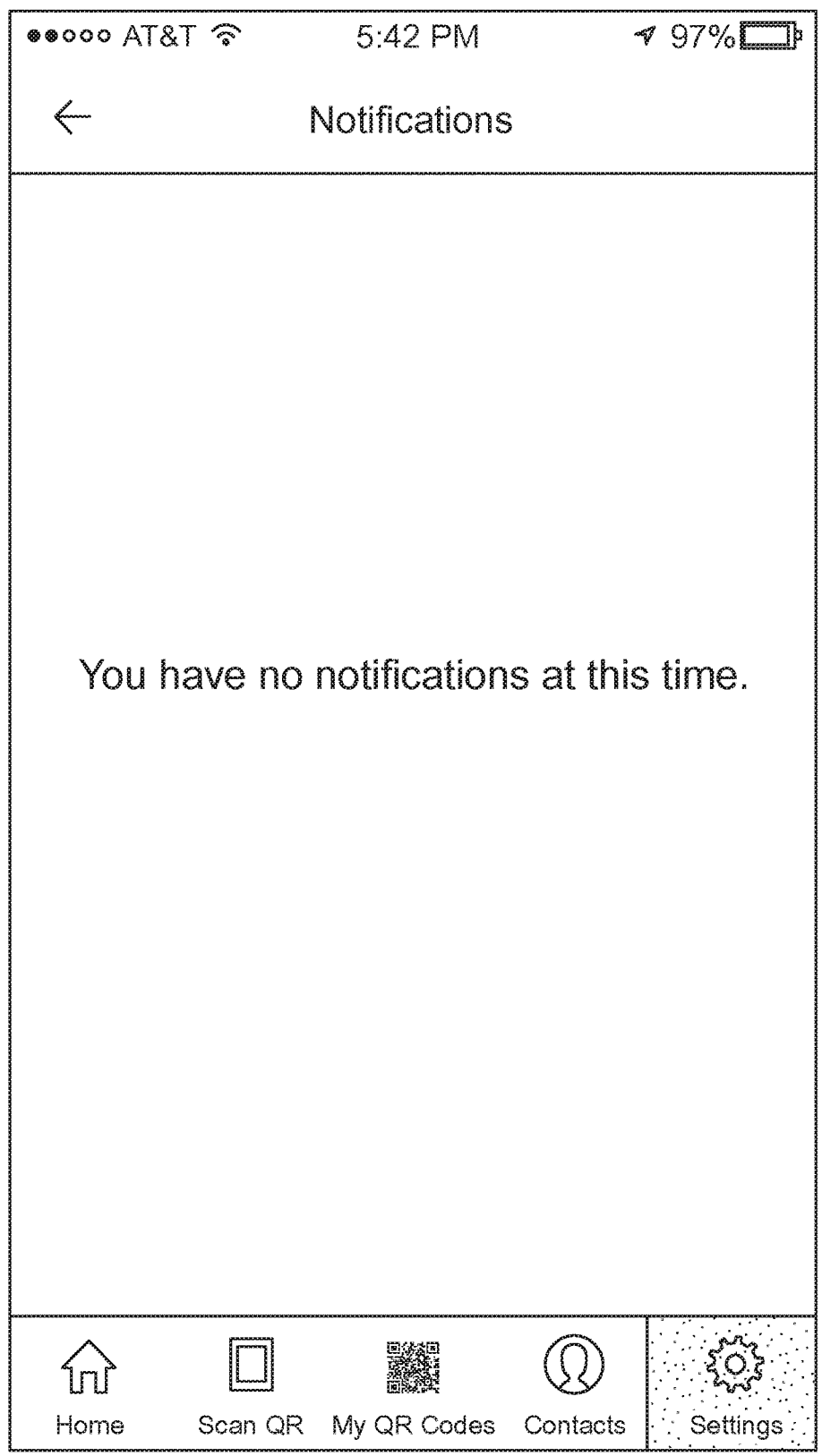

FIG. 24 shows a blank Notifications page. A user receives notifications when he has scanned someone, someone has scanned him, when an anonymous chat message is waiting, when an anonymous contact is about to expire or when it has expired, and also when the system or the system administrator chooses to send any information relevant to a particular user or group of users. Since in the illustrated example, there are no notifications, the Notification screen says "You have no notifications at this time". If there were notifications, it would display them and have a time and date next to each. User receives notifications when he has scanned someone, someone has scanned him, when someone has sent an anonymous chat message and is waiting, when an anonymous contact is about to expire or when it has expired, and also when the system or the system administrator chooses to send any information relevant to a particular user or group of users.

Figure 25:
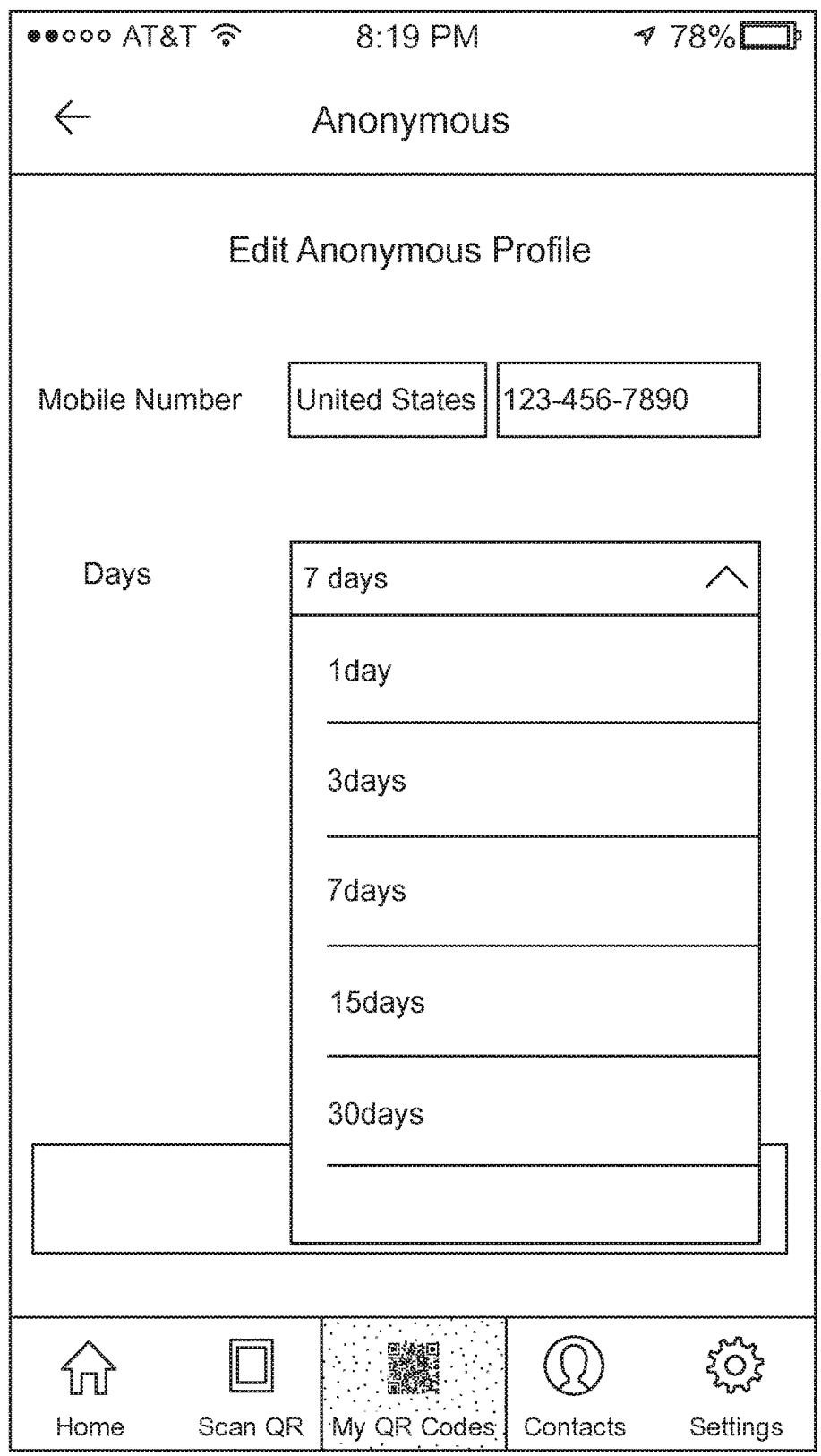

As shown in FIG. 25, a user with an Anonymous profile can decide the number of days someone can keep in contact with him, through a secure server, using that particular anonymous profile. Choices are 1 day, 3 days, 7 days, 15 days, or 30 days.

All confidential user data is preferably stored in the secure server and not in the client. In some environments, such as Android and the Picasa image server, images such as Profile pictures and QR codes) may be securely cached in the client side.

It is required for a second person to have the app in order to scan a QR code, call/text/email one of his/her contacts, and visit any of his/her contacts' Facebook/Twitter/LinkedIn/Instagram.

An 8 digit random code is preferably generated for each profile created by any user. No private data is encoded into the QR Code. If someone uses another application to scan the QRCode, all they would get is an 8 digit random code that must be decoded after it is received by the secure server.

Each profile is associated with a QR Code. If a user has two profiles, he has 2 QR Codes associated with them. The number of codes has no relation with the number of contacts of a user. For example, a user, say "personA", has 50 contacts and 2 profiles for himself. He has 2 QRCodes (one for each profile). The contacts are linked through the internal user IDs of the app. So if "personA" has 50 people in his contacts, in the contacts table his userID is linked to 50 other user IDs.

The passwords are preferably encrypted using a MD5# algorithm (This encryption cannot be decrypted, only compared). All other data is stored as such. If 2 parties are exchanging messages they do it through a conversation ID which links their user IDs. Chat Messages that users send to each other are stored in a messages Table in the server. Other messages like SMS(Text) messages are stored in a standard way in the phones.

Those skilled in the art will realize that although the invention has been described with reference to a specific coding format (a high capacity 40-L QR code), many of the underlying concepts are usable with other known and not yet known scannable code formats, and the invention is not necessarily limited to encoded data that are embodied in known scannable codes such as one dimensional UPC barcodes or two dimensional QR codes.

What is claimed is:

1. A system for facilitating private or anonymous communication between publishers and consumers, comprising:
   a secure remote server for facilitating secure communications over a public digital communication network;
   at least one publisher terminal integrated with a respective smartphone communication device including:
      an optical display for displaying a two dimensional code symbol in which is embedded a respective sequence of digital data including a digital identification code corresponding to a particular communication profile of a local particular publisher, and
      a publisher remote app for generating the two dimensional code symbol for a selected communication profile and for transmitting a corresponding unique identification code and related details of the corresponding communication profile to the secure remote digital server over a public digital network; and
   a plurality of consumer terminals, each integrated with a respective smartphone communication device which includes:
      an optical scanner for scanning the two dimensional code symbol displayed on the optical display of the publisher terminal to thereby produce a scanned code symbol,
      a consumer local app for converting the scanned code symbol into a corresponding two dimensional pattern of dots and for extracting therefrom the particular sequence of digital data embedded therein, and
      a consumer remote app for using extracted digital identification code data about the publisher and other private information about the consumer and the consumer terminal to establish secure two way communication with the publisher terminal via the remote digital server;
   wherein the code displayed by the publisher and scanned by the consumer includes sufficient encoded digital information to permit the consumer terminal to establish secure private communication with the publisher terminal via the digital server, without revealing to the consumer or the consumer terminal a network address of the publisher terminal or any other information designated anonymous by the publisher, and without revealing to the publisher or the publisher terminal a network address of the consumer terminal or any other information designated anonymous by the consumer.

2. The system of claim 1, wherein the publisher terminal has the ability to function as a consumer terminal under the control of the local and remote consumer apps, and at least some of the consumer terminals have the ability to function as respective publisher terminals under the control of respective local and remote publisher apps.

3. The system of claim 2, wherein the secure digital server stores private information previously uploaded by the publisher and by the consumer.

4. The system of claim 3, wherein at least some of the previously uploaded private information is used by the secure digital server to establish secure communication with the party that uploaded that information.

5. The system of claim 4, wherein any previously uploaded private information about the consumer is deleted from the secure digital server if the consumer has not subsequently authorized its release to the publisher or any other consumer within a predetermined time.

6. The system of claim 4, wherein if the displayed profile identification code and related information transmitted to the secure server by a publisher terminal corresponds to an anonymous profile having a predetermined time limit, then once that time limit has expired, any subsequent attempted use of that information by a consumer terminal to communicate with the publisher terminal via the secure server is automatically disabled.

7. The system of claim 6, wherein if the same publisher terminal re-displays the same profile identification code for that anonymous profile at a second time during which that code is re-scanned by the same consumer terminal, the time limit for use of that profile by that consumer terminal is reset.

8. The system of claim 2, wherein the publisher remote app maintains a table of previously generated codes which include a corresponding time, location, and/or other transactional details associated with the generation of each.

9. The system of claim 2, wherein the publisher remote app maintains multiple contact profiles each associated with a different contact or class (personal, professional, or anonymous) of contact.

10. The system of claim 9, wherein the encoded digital data does not include any private data, but only an 8-digit pseudo random number that is used by the secure digital server to access a previously stored profile.

11. The system of claim 10, wherein the encoded profile data for a particular user that is in contact with multiple other users is stored only once on the secure server, but is linked in a contacts table to all the other users with which that particular user is in contact.

12. The system of claim 11, wherein the profile of an anonymous user who subsequently authorizes sharing of his private contact information with another user is automatically reclassified as a private contact of that other user.

* * * * *